US006668853B2

(12) United States Patent
Dean

(10) Patent No.: US 6,668,853 B2
(45) Date of Patent: Dec. 30, 2003

(54) PRESSURE RELIEF VALVE WITH FIELD-REPLACEABLE HIGH CORROSION-RESISTANT COMPONENTS

(75) Inventor: Robert H. Dean, Evanston, IL (US)

(73) Assignee: Delaware Capital Formation, Inc., Wilmington, DE (US)

(*) Notice: Subject to any disclaimer, the term of this patent is extended or adjusted under 35 U.S.C. 154(b) by 46 days.

(21) Appl. No.: 10/134,233

(22) Filed: Apr. 29, 2002

(65) Prior Publication Data

US 2002/0166588 A1 Nov. 14, 2002

Related U.S. Application Data

(60) Provisional application No. 60/289,988, filed on May 10, 2001.

(51) Int. Cl.[7] ........................ F16K 17/06; F16K 43/00
(52) U.S. Cl. ........................ 137/315.04; 137/315.01; 137/315.27; 137/469; 137/494; 137/542; 251/333; 251/361; 251/362; 251/363; 251/367; 251/368
(58) Field of Search ................ 137/315.01, 315.04, 137/469, 470, 476, 494, 505.35, 507, 509, 510, 516.29, 542, 315.27; 251/144, 333, 361, 367, 362, 363, 368

(56) References Cited

U.S. PATENT DOCUMENTS

| | | | |
|---|---|---|---|
| 2,226,732 A | * 12/1940 | McBride | 137/469 |
| 2,335,829 A | * 11/1943 | McBride | 137/469 |
| 2,507,851 A | * 5/1950 | Bryant et al. | 251/361 |
| 2,628,633 A | * 2/1953 | Folmsbee | 137/469 |
| 2,657,897 A | * 11/1953 | Folmsbee | 251/333 |
| 2,695,032 A | * 11/1954 | Kmiecik | 137/469 |
| 2,740,425 A | * 4/1956 | Garland | 137/469 |
| 2,853,097 A | 9/1958 | Davis | |
| 2,875,978 A | * 3/1959 | Kmiecik | 137/469 |
| 2,910,998 A | 11/1959 | Davis | |
| 2,939,479 A | * 6/1960 | Gilmore | 137/469 |
| 2,979,067 A | * 4/1961 | Kern, Jr. et al. | 251/362 |
| 3,006,361 A | * 10/1961 | Reinemann | 251/361 |
| 3,067,769 A | * 12/1962 | Skulley | 137/494 |
| 3,104,673 A | 9/1963 | Kirsch | |
| 3,123,092 A | 3/1964 | Kmiecik et al. | |
| 3,361,154 A | * 1/1968 | Alexandre | 137/315.04 |
| 3,461,905 A | 8/1969 | McCabe | |
| 3,605,793 A | * 9/1971 | Kinsel | 137/469 |
| 3,872,875 A | 3/1975 | Raidl, Jr. | |
| 3,970,280 A | * 7/1976 | Kunz | 251/361 |
| 4,040,442 A | * 8/1977 | Alexandre | 251/361 |
| 4,201,242 A | 5/1980 | Troxell, Jr. | |
| 4,440,189 A | 4/1984 | Graham | |
| 4,485,843 A | 12/1984 | Wolff | |
| 4,532,958 A | 8/1985 | Napolitano | |
| 4,674,530 A | * 6/1987 | Bickford | 137/469 |
| 4,799,506 A | * 1/1989 | Taylor | 137/469 |
| 4,932,434 A | * 6/1990 | Taylor | 137/469 |
| 5,333,635 A | 8/1994 | Higgins et al. | |
| 5,503,180 A | * 4/1996 | Nimberger | 251/368 |
| 5,644,930 A | 7/1997 | Albertson et al. | |
| 5,678,604 A | 10/1997 | Plauborg et al. | |
| 5,738,333 A | 4/1998 | Cognevich et al. | |
| 5,855,225 A | 1/1999 | Williams, III | |
| 6,209,561 B1 | 4/2001 | Kugelev et al. | |

* cited by examiner

Primary Examiner—George L. Walton
(74) Attorney, Agent, or Firm—Seyfarth Shaw LLP

(57) ABSTRACT

A pressure relief valve has a gasketed main body fastened to a vessel wall adjacent to a vent port, the body having a recess surrounding the port which receives a plastic insert removably coupled to the body by a retaining ring fastened to the main body. The insert defines a passage communicating with the port and a valve seat engageable by a seal assembly for closing the valve. The seal assembly includes an annular retainer for a seal O-ring and a plug receivable through the retainer and into a socket in a valve stem, which is spring-biased against the retainer and is guided in a guide assembly removably mounted on the main body. The insert is formed of plastic and the retainer and plug may also be formed of plastic and can be readily field-removable by simply unbolting the housing from the vessel and unfastening the retaining ring. The guide and bias assemblies need not be disassembled.

20 Claims, 2 Drawing Sheets

PRESSURE RELIEF VALVE WITH FIELD-REPLACEABLE HIGH CORROSION-RESISTANT COMPONENTS

RELATED APPLICATION

This application claims the benefit of the filing date of co pending U.S. Provisional Application No. 60/289,988 filed May 10, 2001.

BACKGROUND

This application discloses a pressure relief valve of the type usable on vessels for containing highly corrosive chemicals. Such valves may be used on railway tank cars or other transportation or storage vessels.

For various reasons, railway industry standards set by the AAR currently require that, aside from O-rings and other seals, the materials for construction of pressure relief valves be metallic. For example, parts connected directly to the vessel wall may undergo substantial bending or tensile stresses in use. Typically, the parts of such pressure relief valves which may be "wetted" by, i.e., exposed to contact with, the lading in use, are formed of metals exhibiting high corrosion resistance, such as stainless steel, zirconium, and alloys such as those sold under the trademarks MONEL and HASTELLOY, all of which are quite costly. Furthermore, parts made of such metals heretofore have had to be fabricated by casting, resulting in significant porosity. While some materials, such as zirconium have recently become available in less porous bar stock, it is still quite expensive.

Less costly materials which afford adequate corrosion resistance, such as certain plastics, are known, but have heretofore not been permitted in pressure relief valves for railway tank cars because they have lacked sufficient tensile or bending strength and/or fire-resistance to be used in the "wetted" parts of current pressure relief valve designs.

In prior pressure relief valve designs, the main valve body has been of unitary one-piece metal construction. Thus, while only portions of such valve bodies may be exposed to corrosive chemicals in use, repair of corrosion damage has entailed replacing the entire body, or returning the valve to the manufacturer for remachining and/or recoating of the valve body, since such procedures cannot be performed in the field.

SUMMARY

This application discloses a pressure relief valve which avoids the disadvantages of prior valve designs, while affording additional structural and operating advantages.

An important aspect is the provision of a pressure relief valve for use in highly corrosive environments which is of simpler and more economical construction that current designs.

Another aspect is the provision of a pressure relief valve of the type set forth, which has parts exposed to highly corrosive ladings in use which can, nevertheless, be safely formed of non-metallic materials.

In connection with the foregoing aspect, another aspect is the provision of a pressure relief valve of the type set forth, wherein the parts of the valve exposed to corrosive ladings are subjected to minimized tensile or bending stresses.

A still further aspect is the provision of a pressure relief valve of the type set forth, wherein the parts exposed in use to corrosive ladings are relatively easily field-replaceable.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

Figure 1:
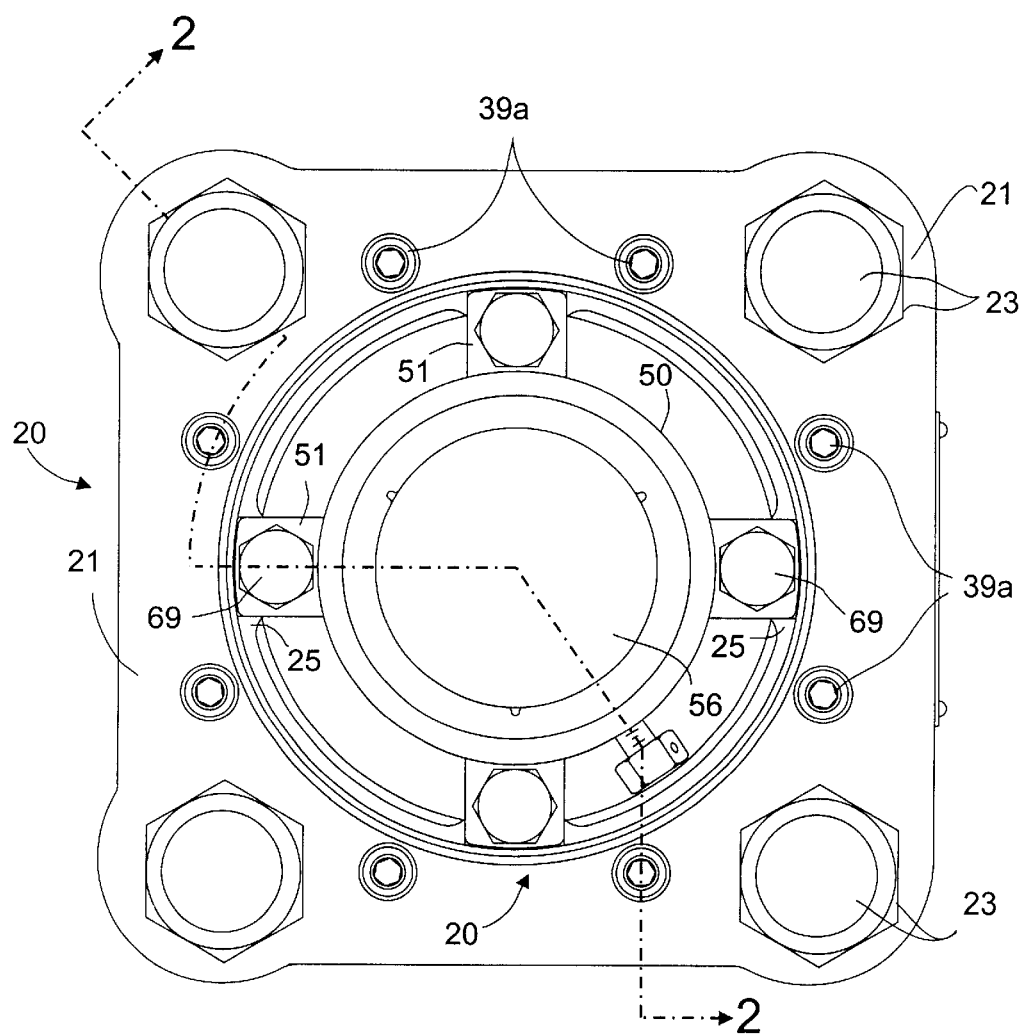
FIG. 1 is a top plan view of a pressure relieve valve.
Figure 2:
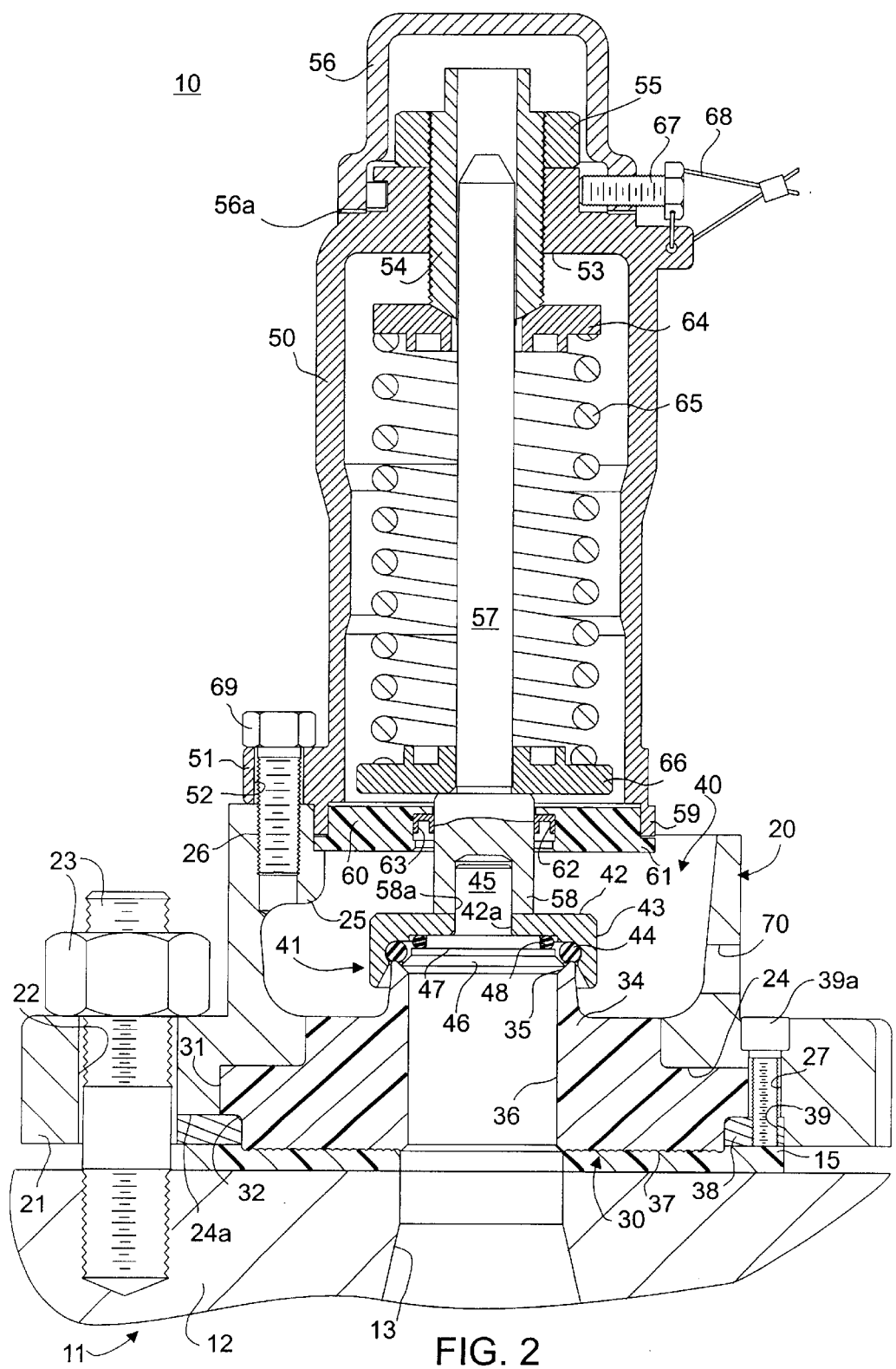
FIG. 2 is a sectional view of the pressure relief valve of FIG. 1 and a portion of a railway tank car on which it is mounted, taken generally along the line 2—2 in FIG. 1.

Referring to the drawings, there is illustrated a pressure relief valve 10 mounted on the tank 11 of a railway tank car of the type utilized for transporting ladings, such as highly corrosive chemicals. The tank 11 has a top wall 12 in which is disposed a vent aperture or port 13, the outer end of which is encircled in use by a suitable gasket 15.

The relief valve 10 has a main body or housing 20, which may be generally cylindrical in shape, and is provided with a laterally outwardly projecting attachment flange 21, which may be rectangular in shape and is provided, preferably respectively adjacent to its corners, with a plurality of holes 22 for receiving suitable threaded fasteners 23, adapted for threaded engagement in complementary threaded bores in the tank wall 12, in a known manner. The gasket 15 may be sized so that the fasteners 23 will serve to center it relative to the aperture 13. The inner end of the body 20 is counter bored to define a recess forming an annular shoulder 24, and is further counter bored to define an annular shoulder 24a. Projecting radially inwardly from the body 20 above or outwardly of the shoulder 24 is a plurality of equiangularly spaced bosses 25, respectively having internally threaded holes 26 formed therethrough. Another series of equiangularly spaced holes 27 are formed through the flange 21 just inboard of the holes 26 so as to pass through the shoulder 24a.

Disposed in the counter bore of the body 20 is an annular insert 30, which may be formed of a plastic material having suitable corrosion and fire-resistance, such as polyvinylidene fluoride, an engineered plastic sold by Pennwalt Corporation under the trademark KYNAR. The insert 30 has a peripheral cylindrical flange 31, which seats against the shoulder 24 and has formed in the underside thereof an annular recess defining a shoulder 32 which is substantially flush with the shoulder 24a when the insert 30 is mounted in place. The insert 30 has a cylindrical hub 34 which defines at its upper or outer end an annular valve seat 35, which may have a tapered or inclined, generally frustoconical surface. The hub 34 defines a circular opening or passage 36 centrally through the insert 30 which, in use, is aligned with the vent aperture 13 in the tank wall 12. The lower or inner surface of the insert 30 maybe suitably grooved to provide improved retention of the gasket 15. An annular retainer 38, which may be formed of a suitable metal, such as stainless steel, is seated against the shoulders 24a and 32 and is dimensioned so that, when thus seated, its lower surface is substantially flush with that of the body 20. Internally threaded holes 39 are formed through the retainer 38, respectively aligned with the holes 27. Respectively received through the holes 27 and threadedly engaged in the holes 39 are screws 39a. The holes 27 may be countersunk to receive the heads of the screws 39a.

The relief valve 10 is provided with a seal assembly 40 which includes a generally cup-shaped retainer 41, which may be formed of metal or of the same plastic material as the insert 30. The retainer 41 has an annular end wall 42 integral at its periphery with a depending cylindrical flange 43 which, in use, fits telescopically over the upper end of the insert hub 34. Seated in the retainer 41 is a seal O-ring 44 which, in use, engages the valve seat 35 on the insert 30. A cylindrical plug 45, which may be formed of the same material as the insert 30, extends upwardly through the opening 42a in the center of the retainer end wall 42, and is provided at its lower end with an enlarged-diameter end wall or flange 46 defining an annular shoulder 47 which seats an O-ring 48 for sealing the plug 45 against the retainer 41.

The relief valve 10 also includes an elongated, generally cylindrical guide 50 disposed substantially coaxially with the body 20 and having a laterally outwardly extending equiangularly spaced arms 51, each of which has formed therethrough a hole 52 (one shown). The upper end of the guide 50 is closed with an end wall 53 having a central, internally threaded opening therein in which is threadedly engaged an elongated, hollow, cylindrical adjusting screw 54, which is threadedly engageable with a nut 55 above the end wall 53. A cap 56 may cover the nut 55 and the upper end of the adjusting screw 54, seating against a gasket 56a on the end wall 53. The upper end of an elongated cylindrical stem 57 is slidably received coaxially in the adjusting screw 54 and is integral at its lower end with an enlarged-diameter socket base 58, which bears against the outer surface of the retainer end wall 42 and defines in its lower end a socket 58a for receiving the plug 45. Depending from the lower end of the guide 50 is a cylindrical flange 59 which is dimensioned to fit inside the bosses 25 of the body 20.

The lower end of the guide 50 is closed by an annular seal retainer 60 which fits around the socket base 58 and may be formed of the same material as the insert 30. The retainer 60 is dimensioned to fit snugly inside the cylindrical flange 59 of the guide 50 and is provided at its lower end with a radially outwardly extending flange 61, which bears against the lower end of the flange 59 and seats on shoulders on the bosses 25, in use. The lower surface of the retainer 60 is counter bored around its central opening for seating an annular shaft seal 63 which seals against the socket base 58. Disposed within the guide 50 is an annular member 64 which seats against the lower end of the adjusting screw 54 and, in turn, provides a seat for the upper end of a helical compression spring 65, the lower end of which seats on an annular member 66, which bears against the socket base 58 of the stem 57. A seal screw 67 may be threadedly engaged in a radial bore in the cap 56 and be secured by a suitable seal 68 to a portion of the guide 50.

In use, the arms 51 of the guide 50 seat respectively on the upper ends of the body bosses 25, with the holes 52 respectively aligned with the holes 26 in the body 20 and respectively receiving screws 69 which threadedly engage in the holes 26 for fixing the guide 50 to the body 20. The entire relief valve 10 is secured to the tank 11 by the fasteners 23, which may include studs and nuts, with the retainer 38 and the insert 30 in compressive sealing engagement against the gasket 15. The body 20 may be provided with a drain hole 70 to prevent accumulation of rainwater which could freeze and impair operation of the relief valve 10.

When an over pressure condition occurs within the tank 11, the seal assembly 40 is unseated against the urging of the compression spring 65, in a known manner, to relieve the pressure, pressurized lading escaping through the space between the body 20 and the guide 50. In this arrangement the parts 30, 41, and 45, which are not directly connected to the vessel wall 12, are subjected primarily to compressive forces, which the parts can adequately withstand. Furthermore, because these "wetted" parts may be formed of plastic, they can be relatively easily and inexpensively replaced in field repair facilities by simply releasing the fasteners 23 and 39a, without having to remove or disassemble the guide and biasing assemblies. On the other hand, in prior designs, wherein the valve seat is formed on a portion of a unitary metal valve body, either the entire body would have to be replaced at considerable expense, or would have to be remachined and/or recoated, procedures which cannot be accomplished in field repair facilities, necessitating return to the manufacturer.

While, in the illustrated embodiment, the "wetted" parts may be formed of a suitable plastic material, they may, of course, also be formed of ceramic material or of corrosion-resistant metals, as in prior designs. While such parts might be more costly than plastic parts, significant advantages over prior designs would still be afforded, because the entire body would not have to be replaced or reworked to rectify corrosion damage of "wetted" parts.

While the foregoing description has been in the context of a pressure relief valve for a railway tank car, it will be appreciated that the principles of the invention are applicable to other valves used in other applications, such as other types transportation vessels and/or storage vessels, or other applications wherein portions of the valve assembly may be subjected to high bending or tensile stresses while other portions may be subjected to exposure to corrosive materials.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A valve structure for a port in a vessel wall comprising:
   a housing removably mountable on the vessel wall in a mounted condition adjacent to the port,
   a corrosion-resistant insert removably carried by and secured to the housing independently of its mounting on the vessel wall and defining a passage communicating with the port when the housing is in its mounted condition,
   a valve seat on the insert adjacent to the passage, and
   a seal assembly removably carried by the housing independently of the insert for movement between an open condition and a closed condition closing the passage,
   the housing in its mounted condition cooperating with the vessel wall for supporting the insert so that during operation of the valve structure the insert is subjected to substantially only compressive forces.

2. The valve structure of claim 1, wherein the insert is formed of a plastic material.

3. The valve structure of claim 1, wherein the housing has a recess formed therein adjacent to the port, the insert being disposed in the recess.

4. The valve structure of claim 1, and further comprising retaining structure securing the insert in the housing.

5. The valve structure of claim 4, wherein the retaining structure includes an annular retainer engaging the insert around its periphery and fastened to the housing.

6. The valve structure of claim 1, and further comprising a gasket encircling the port and engageable with the insert for cooperation therewith to isolate the housing from contents of the vessel when the valve mechanism is in its closed condition.

7. The valve structure of claim 1, and further comprising bias structure biasing the seal assembly to its closed condition.

8. The valve structure of claim 1, wherein the housing is fastened to the vessel wall with threaded fasteners.

9. A valve structure for a port in a vessel wall comprising:

a housing removably mountable on the vessel wall in a mounted condition adjacent to the port, a corrosion-resistant insert removably carried by and secured to the housing independently of its mounting on the vessel wall and defining a passage communicating with the port when the housing is in its mounted condition, a valve seat on the insert adjacent to the passage, a seal assembly removably carried by the housing independently of the insert for movement between an open condition and a closed condition closing the passage, a gasket encircling the port and engageable with the insert for cooperation therewith to isolate the housing from contents of the vessel when the seal assembly is in its closed condition, and bias structure biasing the seal assembly to its closed condition, the housing in its mounted condition and the gasket cooperating with the vessel wall for supporting the insert so that during operation of the valve structure the insert is subjected to substantially only compressive forces.

10. The valve structure of claim 9, wherein the housing is fastened to the vessel wall with threaded fasteners.

11. The valve structure of claim 10, wherein the fasteners are arranged in a pattern encompassing the port, the gasket being disposed between the fasteners and the port.

12. The valve structure of claim 9, wherein the bias structure includes a helical compression spring.

13. The valve structure of claim 9, wherein the seal assembly includes a retainer and an O-ring seal carried by the retainer and engageable with the valve seat when the valve mechanism is in its closed condition.

14. The valve structure of claim 13, and further comprising a valve stem engageable with the retainer.

15. The valve structure of claim 14, wherein the valve stem has a recess therein and the retainer has an aperture therethrough communicating with the recess, the valve mechanism further comprising a plug receivable through the aperture and in the recess, and an O-ring seal disposed between the plug and the retainer.

16. A valve structure for a port in a vessel wall comprising:

a housing removably mountable on the vessel wall in a mounted condition adjacent to the port, a corrosion-resistant insert removably carried by and secured to the housing independently of its mounting on the vessel wall and defining a passage communicating with the port when the housing is in its mounted condition, a valve seat on the insert adjacent to the passage, a guide structure mounted on the housing, a valve stem removably receivable in the guide structure for guided contact therewith during movement between opening and closing positions, and a seal assembly removably coupled to the valve stem independently of the insert for movement therewith between an open condition and a closed condition closing the passage, the housing in its mounted condition cooperating with the vessel wall for supporting the insert so that during operation of the valve structure the insert is subjected to substantially only compressive forces.

17. The valve structure of claim 16, and further comprising bias means resiliently biasing the valve stem to its closing position.

18. The valve structure of claim 16, wherein the seal assembly includes a retainer engageable with the valve stem, and an O-ring seal carried by the retainer for engagement with the valve seat when the valve assembly is disposed in its closed condition.

19. The valve structure of claim 18, and further comprising a valve stem engageable with the retainer.

20. The valve structure of claim 19 wherein the valve stem has a recess therein and the retainer has an aperture therethrough communicating with the recess, the valve mechanism further comprising a plug receivable through the aperture and in the recess, and an O-ring seal disposed between the plug and the retainer, the insert and the retainer and the plug being formed of plastic or ceramic material.

\* \* \* \* \*